F. C. CODER.
DEVICE FOR LAYING OUT AND ADJUSTING CUTTERS IN CUTTER HEADS.
APPLICATION FILED OCT. 15, 1915.
1,207,712.
Patented Dec. 12, 1916.
2 SHEETS—SHEET 1.
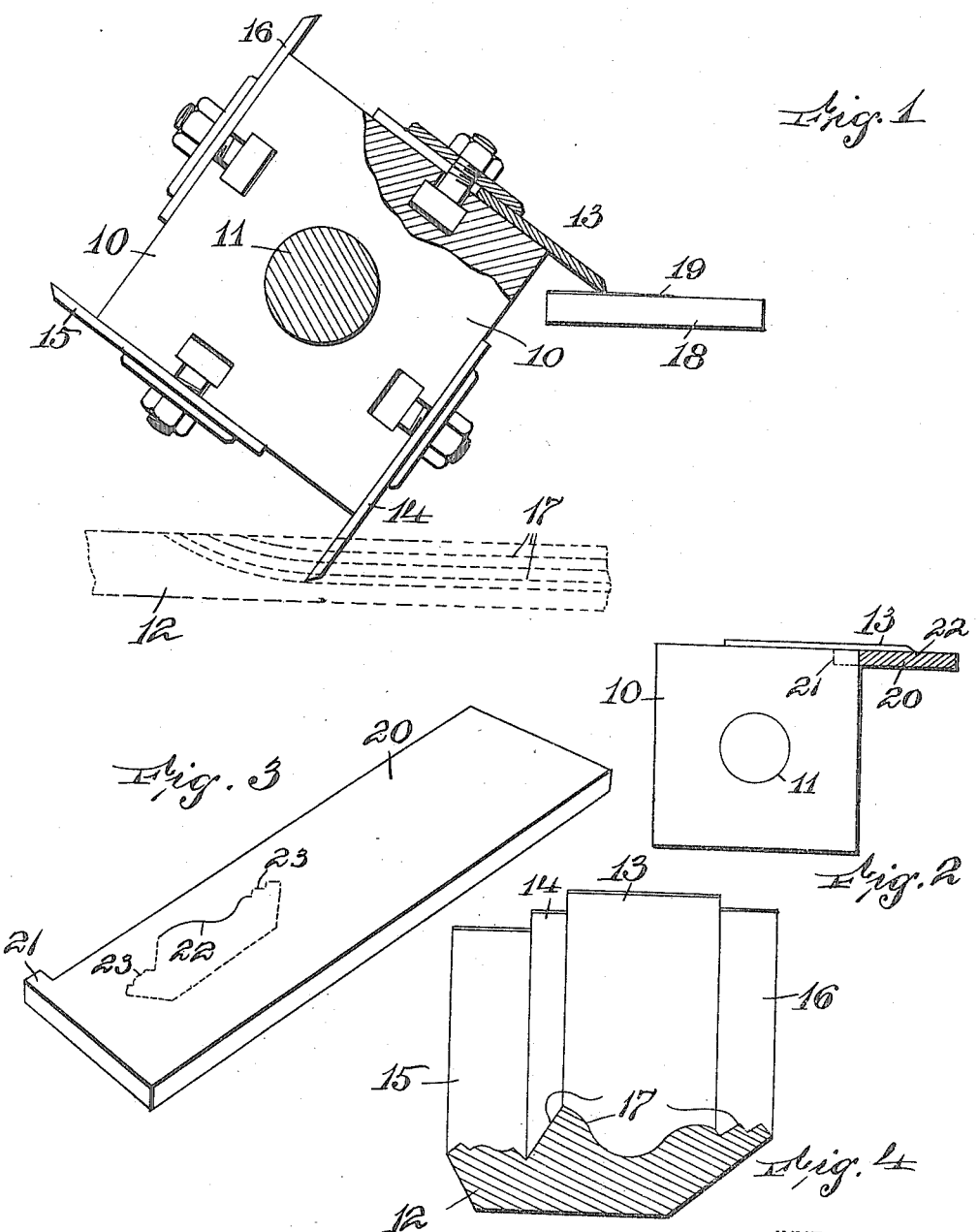

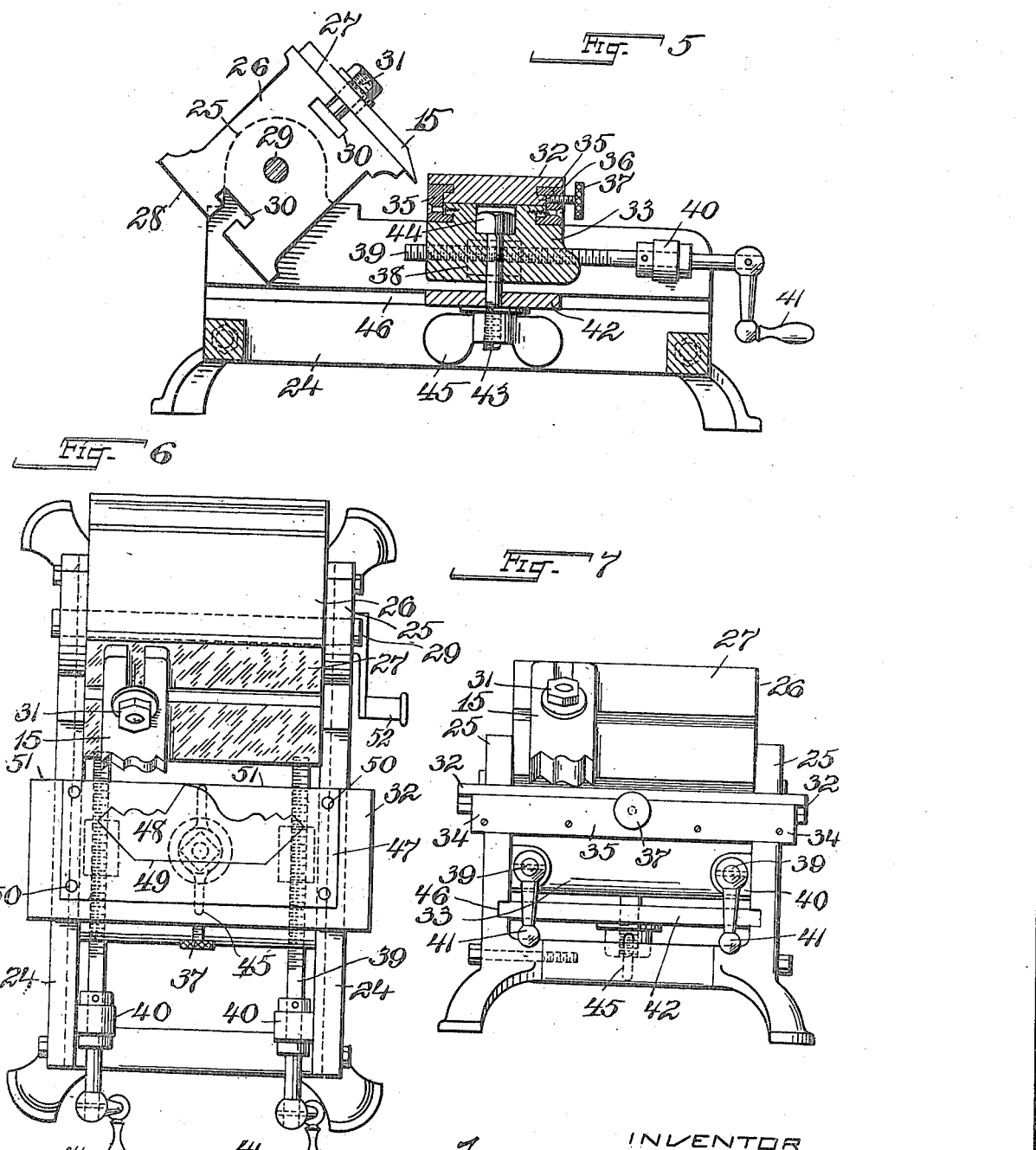

UNITED STATES PATENT OFFICE.

FREDERICK C. CODER, OF EDGEWATER, NEW JERSEY, ASSIGNOR OF ONE-HALF TO MARGARET F. BRENNAN, OF SOUTH OZONE PARK, LONG ISLAND, NEW YORK.

DEVICE FOR LAYING OUT AND ADJUSTING CUTTERS IN CUTTER-HEADS.

1,207,712. Specification of Letters Patent. Patented Dec. 12, 1916.

Application filed October 15, 1915. Serial No. 56,117.

*To all whom it may concern:*

Be it known that I, FREDERICK C. CODER, a citizen of the United States, and a resident of Edgewater, county of Bergen, and State of New Jersey, have invented certain new and useful Improvements in Devices for Laying Out and Adjusting Cutters in Cutter-Heads, of which the following is a specification.

This invention relates to an improved device for laying out cutter-head knives and also for adjusting such cutters in a cutter-head.

The invention provides a means for finding the position of a cutter or cutters to be used; it provides means for adjusting one or more cutters so that they need no testing or removal or readjustment after they are installed, and it does these things without the use of any special rules or scales.

An object of the invention is the provision of means for supporting a pattern or tracing of the molding or other strip to be cut, in a position which is the same relative to the center of rotation of the cutter head as the cut surface of the strip when cut. The cutters, being brought against the pattern, are correctly formed or positioned for work and, by so setting the cutters on the pattern, mistakes in forming or positioning the cutters are practically eliminated.

The invention further provides a means for adjusting cutters and registering their positions on what I term a "pitch board", so that when replaced or placed on another cutter-head, the cutters can be adjusted in their same relative positions so that when several cutters on the same cutter-head are utilized in forming a strip, their paths of rotation will be in proper relation, there will be no overlapping of cuts, and the pattern desired will be reproduced accurately.

The device can be made in different forms and utilized in different ways, but to clearly illustrate the invention and to make its description plain I have shown a machine in the accompanying drawings, which machine illustrates one form of device for carrying out my invention, but it will be understood that changes can be made in the machine, and means for utilizing the device other than in such machine can be used without departing from the scope of the invention.

In said drawings Figure 1 is an end view of a cutter head partly broken away and illustrating the manner of adjusting a cutter on a pattern that is to be cut. Fig. 2 is a diagrammatic view showing a pitch board placed under the cutter for registering its position in relation to the edge of the cutter. Fig. 3 is a perspective view of the pitch board, the outline of the cutter recorded being shown in full lines, and the rest of the molding to be cut being shown in dotted lines. Fig. 4 is a diagrammatic view showing a section of molding and with the cutters used to form such molding placed in register therewith when the cutters are inclined to the work. Fig. 5 is a longitudinal section, with a cutter-head shown in elevation, of a machine for carrying out my invention. Fig. 6 is a top view of the machine shown in Fig. 5, and Fig. 7 is an end view of the machine shown in Fig. 6.

Many forms of devices for laying out cutters have been devised, some of them being in the form of proportional dividers or angle-bars and slides, but these devices have been unsatisfactory and are intricate and make the laying out of the cutter a long process. Scales have also been devised for laying out the edges of the cutter-head knives, but these require skilful using, whereas I have devised a means for laying out the knives and for adjusting the cutters which is quick and by means of which mistakes need not occur, and the repeated removal and regrinding of cutters, in an attempt to get the proper form of cutter, are rendered unnecessary.

In the old form of making cutters and adjusting them the correct depth and shape of the cutter must be determined to allow for the draft of different points of the cutter, particularly when cutting molding and the like, since the cutters act on the wood at an angle and the distance between the upper and lower parts of a cut, at the angle of cutting, is different from the distance between these two parts when measured toward the center of rotation of the cutter-head. After a cutter is made in the old way whether by trial and error, or by means of the complicated scales and instruments made for the purpose, time is wasted in setting the cutters on the cutter-head, because they sometimes are placed in too far or project out too much and must be loosened up and driven backward or forward, then tried again, and so on, and when a number of cutters are on the same cutter-head it sometimes takes hours to have all the cutters completely set up. By my improved means the cutters can be put into proper place, the exact size and shape of cutter can be made for a certain kind of pattern, and furthermore, this can be done without a rule.

Figs. 1 to 3 are rather diagrammatic and illustrate the underlying principle of the invention and the manner of operating it. The device is particularly adapted for making cutters and adjusting cutters for cutter-heads, the cutter-head 10 being of the usual form, this cutter-head being rotatable with the shaft 11 driven in any usual way, such as in the manner employed in molding machines, although this invention is applicable to all machines carrying rotary cutters, and particularly such machines in which the cutters successively cut different parts of the stock to be cut.

For the purpose of illustration this specification will describe cutters that are made and adjusted for cutting the molding 12 which would be cut say by four knives 13, 14, 15 and 16, but these knives would work not at the same time but successively as shown in Fig. 1, it being customary to balance the cutter-heads by putting knives on each face, or if four knives are not required, by placing a plain piece of metal on the unoccupied side so as to give the cutter-head its proper balance. It will be evident that the knives when inclined provide the contour 17 of the molding, but when placed perpendicular to the molding would not cut the required design, and this necessitates making the cutter with its cutting edge of a shape to provide the desired design when the cutter is at an angle to the work.

In my invention I provide a proper support 18 which is held in a position that, in relation to the center of rotation of the cutter-head, is the same as the position of the molding as it lies on the bed of the molding machine, but more readily accessible. The pattern could be suspended or placed on the bed of the machine and held in the same position as the work travels in, but it would be hard to work on in such position, so that I preferably shift the support 18 to the position shown diagrammatically in Fig. 1, a suitable support being omitted in this figure but being fully illustrated and described hereinafter. On the support 18 I place a pattern 19 which is usually a tracing on tracing paper, and the cutter 13, for instance, is held on the cutter-head in its exact position and is made to register on the pattern of the molding or rather that part of the molding that it is to cut. When the support 18 is held against movement the cutter can be placed absolutely in position and can be thus adjusted to operate on the stock 12 to produce an accurate strip. If it is desired to retain a gage or finger for replacing the cutter or cutters at any time, I transfer the outline of the cutter to a pitch board 20 which is placed against the cutter-head as shown in Fig. 2. The pitch board 20 is placed underneath the knife substantially parallel thereto, and in order to have the proper longitudinal position it is usually provided with a stop 21 which fits against the side of the cutter-head and acts to assist in squaring it and also to insure its proper position longitudinally. On the surface of the pitch board 20 is traced or marked, with a pencil or any sharp instrument, a line, such as 22, which reproduces the edge of the cutter and also defines its position with respect to the edge of the cutter-head and the end of the cutter-head. It will be evident that when the other knives 14, 15 and 16 are similarly adjusted against the pattern on the sheet 19 and are then transferred to the pitch board 20 in the positions illustrated in dotted outlines at 23, any future installation of these cutters on a cutter-head can be quickly made, since a record of their positions, relative to the cutter-head, is preserved on the pitch board, and by placing the pitch board in the position shown in Fig. 2 and a cutter laid thereon so that its edge coincides with the line that records its edge and then clamped into position, it will register with the other cutters similarly installed and time is saved in such installation.

The above is a general statement and description of the invention and its use, but I have illustrated a machine which can be used for marking out cutters and for adjusting them on cutter-heads, and a machine having a cutter-head support and also a pattern support which are adjustable in relation to each other, and one which shows a method of carrying out the invention with exactness. In the machine illustrated the frame 24 consists of side pieces which are provided on one end with bearings 25 in which a cutter-head 26 is mounted, and for the purpose of making the machine of wide application, the cutter-head 26, which is simply a cutter-head to be used for gaging the cutters and is not to be transferred to a molding machine, has its sides of different sizes. For instance, the side 27 can be made of the same dimension as a cutter with a four inch cutter-head, and the side 28 made similar to a three inch cutter-head. The remaining sides if necessary can be made for still different sizes of cutter-heads, such as two or two and one-half inches. This can be done because the same side of the cutter-head can be used successively for adjusting cutters to be actually used on the different faces or sides of the cutter-head in the molding machine, and this testing machine is thus available for gaging cutters for many different sizes and types of molding machine.

The cutter-head 26 is rotatably arranged on the shaft 29 and is freely movable by hand and is provided with the grooves 30 in which the usual form of nut and bolt fastening 31 is used for adjusting the cutter which in the drawing happens to be the cutter 15. The support 32, which is the equivalent of the support 18 in Fig. 1, is movably supported in the machine, one form of support that is illustrated consisting of a block 33 having its projecting ends 34 resting on the tops of the side frames 24, the ends 34 being part of the guides 35 which are shaped to form the dove-tailed or tongue and groove connections 36 so that the support 32 can be slid transversely and when in the desired position can be held in place by the set-screw 37. The block 33 has screw-threaded bearings 38 through which the screws 39 pass, the screws 39 being mounted in bearings 40 on the side frame of the machine and being provided with suitable handles 41. As the handles are turned the block 33 and the support 32 are moved back and forth according to the rotation of the screws 39, the block 33 being clamped in place, when desired, against any movement by the screws, by means of a strip 42 through which the bolt 43 passes, the bolt 43 having its head 44 in the block 33 and being provided with a hand nut 45. The parts can thus be drawn together so as to be tightened in place and the strip 42 clamped against movement in the slots 46 in the side frames, and it will be evident from this description that the support 32 can be adjusted and held in adjusted position both longitudinally and transversely.

The machine is used as follows: A tracing or a similar pattern of the molding is placed on a sheet of tracing paper or cloth as shown at 47, which is the equivalent of the sheet 19 in Fig. 1, the pattern 48 being arranged so that its bottom line 49 is parallel with the edge 51 of the support 32, is fastened down in any suitable manner, such as by means of the thumb tacks 50. The top edge or highest point (or points if more than one) of the pattern of the molding is preferably placed along the edge 51 of the support 32. The screws 39 are operated by the handles 41 to allow for the projection of the machine so that bolts and so forth will clear properly, that is, for example, if the projection of the machine is one-quarter of an inch the space between the edge 51 and the corner of the cutter-head 26 will be one-quarter of an inch. The cutter 15 is then adjusted so that the most salient point of its cutting edge engages that part of the pattern with which it is expected to register and is thus put in proper position to cut the desired form of molding at the angle it assumes at its cutting point in the molding machine. After the bolt 31 is clamped to hold the cutter 15 in place the cutter-head 26 is swung up to the position illustrated in Fig. 2, the pitch board 20 is placed under the cutter and its outline is marked on the pitch board. The cutter 15 is now removed from the cutter-head 26 and the next cutter, such as 13, 14 or 16, is placed on the cutter-head 26 and similarly adjusted, and it will thus be seen that after all the cutters have been thus manipulated on the cutter-head and traced on the pitch board that the pitch board will contain a complete outline of the edge of the cutters, and when the pitch board is put against a cutter-head of the molding machine the cutters can be laid on the pitch board and the face of the cutter and accurately placed in position, since the pitch board is held in the same relative position when each cutter is adjusted by means of the shoulder or extension 21 fitting against the end of the cutter. The transverse movement of the support 32 is provided to allow a transverse shifting of the pattern to fit different types of molding machines, since the guides against which the stock rests in molding machines are at different distances from the edge of the cutter-head in different makes of machines.

Suitable gages or marks can be placed on the machine to identify the distance from the edge of the cutter-head that the edge of the pattern occupies, as will be evident. It will be understood that the side of the adjusting head or cutter-head in the machine, on which the cutters must be tested, must be of the same size as the cutter-head of the molding machine on which the knives are to be placed. In this machine the workman can ascertain at once whether any bolts are going to strike the work in the rotation of the cutter-head, the waste of time in the old form of adjusting and readjusting and trying out cutters on cutter-heads is eliminated, and I have found that I can place ten or twelve cutters on the top cylinder or cutter-head of a molding machine directly from a tracing or pattern of a detail, all cutters cutting different members without the necessity of changing any cutter after it is put in place. It is sometimes found in outside molding machines that the bed is worn on the inside or the cutter-head babbitted out of line with the bed, which gives a greater projection to the cutters on the inside than the outside, and in such case the pitch board can be adjusted to the same angle as the bed, and the cutters when put on from such pitch board go on as if the head were parallel with the bed.

It will be understood that for convenience in handling, the shaft of the machine or the cutter-head can be provided, if desired, with a handle 52 to facilitate its operation. This relates to the cutter-head that is in the adjusting machine, and such handle can be placed so that it leaves one hand free to adjust the cutter and the other to work the cutter-head back and forth slightly in securing the proper angle at which the cutter engages the pattern.

Having thus described my invention, I claim:

1. A device of the kind described comprising a frame, a cutter-head rotatable in the frame, a block sliding in the frame, a screw adjustment for the block, a pattern support sliding on the block, and means for locking the pattern support, the parts being disposed to hold the face of the pattern support substantially radial to the center of rotation of the cutter-head.

2. In a device of the class described, a frame comprising side bars, a cutter-head having bearings in said side bars, a table for supporting a pattern with the top surface of the table in a plane including the cutter-head axis, and means for moving said table along said side bars to and from the cutter-head.

3. In a device of the class described, a frame comprising side bars, a cutter-head having bearings in the side bars, a table for supporting a pattern with its top surface in a plane including the cutter-head axis, means for moving said table along said side bars to and from the cutter-head, and means for moving said table in a direction transverse to the first-named movement.

4. In a device of the class described, the combination of a frame adapted to stand solidly on a base and comprising side bars, a cutter-head having bearings in said side bars, a pattern-carrying table on said frame and having its top surface in a plane including the axis of the cutter-head, a traveling carriage upon which said table is supported, means for moving said carriage longitudinally of the frame toward and away from the cutter-head, and a slide-way in said carriage arranged transversely of said side bars and wherein the said table may be moved transversely to its movement along said side bars.

5. In a device of the class described, the combination of a frame adapted to stand firmly on a base and comprising a pair of side bars, a cutter-head having bearings in said side bars, a carriage extending across transversely of said side bars, slide-ways in said carriage, a pattern-carrying table in said slide-ways and having its top surface in a plane including the axis of the cutter-head, and a pair of screws, one of said screws attached to each of said side-bars, said screws serving to move said carriage and table longitudinally of the side bars to and away from the cutter-head.

6. In a device of the class described, a frame adapted to stand solidly on a base and comprising a pair of side bars, a cutter-head having a shaft mounted for rotation in and extending transversely of said side bars, a carriage adapted to rest on said side bars and to be received therebetween, a plate adapted to engage beneath a portion of said side bars, a table mounted on said carriage and having its top surface in a plane including the axis of the cutter-head, means for moving said carriage longitudinally of said frame, and means for clamping said plate to said carriage to lock the same in adjusted position.

7. In a device of the class described, a frame adapted to stand solidly on a support and including side bars, a cutter-head having bearings in said side bars, a carriage adapted to slide upon and between said side bars, guide-ways provided in the upper portion of said carriage, a table on said carriage and received in said slide-ways and movable on said carriage transversely of the apparatus, a pair of screws for moving said table and carriage longitudinally of the apparatus, said side bars each having a groove in its inner wall, a plate received within said groove, and a clamping screw extending from said carriage through said plate and having a thumb screw on its end whereby the carriage and plate may be clamped together and both locked in place.

In testimony that I claim the foregoing, I have hereto set my hand, this 13th day of October, 1915.

FREDERICK C. CODER.